Patented Feb. 21, 1939

2,148,042

UNITED STATES PATENT OFFICE 2,148,042

COMPOUNDS OF THE DIBENZANTHRONE SERIES

Otto Stallmann, South Milwaukee, and William M. Wentz, Milwaukee, Wis., assignors to E. I. du Pont de Nemours & Company, Wilmington, Del., a corporation of Delaware No Drawing. Application January 24, 1938, Serial No. 186,750

5 Claims. (Cl. 260—355)

This invention relates to the preparation of compounds of the dibenzanthrone series and more particularly to the preparation of new and valuable stable reduction products of alkyl ethers of Bz-2,Bz-2'-dihydroxydibenzanthrone.

The term vat dyestuffs is used to refer to those ketonic dyestuffs which must be reduced to a soluble form in their application to fibers. The reduction of ketonic dyestuff to the hydroxy, or leuco-derivative is generally spoken of as vatting. This vatting being effected with alkaline reducing agents the leuco compound generally exists as the water soluble alkali metal salt. The free leuco compound (free OH) can be obtained by acidifying the vat and filtering off the precipitate. This free leuco compound, however, is soluble in alkalies, and is unstable in air, being quickly oxidized back to the keto form. The alkali metal salts of the leuco, are likewise very unstable to air oxidation and must be used in dyeing in the presence of excess reducing agent.

In many chemical reactions where an especially reactive form of the anthraquinone or other vattable ketonic compound is desired, they are employed in the leuco form.

Due to the fact that in the dyeing of the ordinary vat dyestuffs a relatively high concentration of alkali is employed, they are suitable chiefly for the dyeing of cotton fibers. Because of the necessity of using strong reducing agents they cannot be applied in combination with dyestuffs that are deleteriously affected by such reducing agents.

More recently water soluble leuco sulfuric acid esters of the vat dyestuffs have been prepared which can be reconverted to the insoluble form on the fiber by means of acids or acids and oxidizing agents. Although the leuco sulfuric acid esters of vat dyestuffs find a wider range of use than the ordinary vat dyestuffs because they can be dyed without the use of alkaline reducing agents, their use has been limited by the exceptionally high cost of preparing them. Many attempts have been made to prepare vat dyestuffs in a form more suitable for dyeing under a wider range of conditions. While it is possible to isolate vat dyestuffs as the free leuco compound, the instability of the free leuco compounds prevents their general use in the trade in this form, and attempts have also been made to put the leuco compound in a form which will be stable under ordinary conditions and yet can be reconverted to the keto form under conditions which are not deleterious to the usual fibers or to other types of dyestuffs with which they may be employed.

It has been found that certain substituted indigos and thioindigos can be reduced to stable products which can be used for printing with less reducing agent than is normally required (see, for instance, U. S. Patents 2,044,790, 2,045,476 and 2,045,477). The procedure disclosed in these patents, however, was found to be very limited in its application, since even the closely related unsubstituted indigo compounds cannot be converted to the stable leuco form by this process.

We have now found that the alkyl ethers of Bz-2,Bz-2'-dihydroxydibenzanthrone, when in relatively pure form such as for example Bz-2,Bz-2'-dimethoxydibenzanthrone and its higher alkyl homologues including those compounds which are formed by alkylations of Bz-2,Bz-2'-dihydroxydibenzanthrone with alkylating agents including the alkyl dihalides such as 1.3 dibromopropane, 1.3 dibromobutene etc. or the corresponding glycol esters of arylsulfo acids, form stable reduction products which are insoluble in alkalies and which can be regenerated to the common leuco form without the use of reducing agents.

It is therefore an object of this invention to prepare stable leuco compounds of the alkoxy derivatives of Bz-2,Bz-2'-dihydroxydibenzanthrone which are stable under ordinary conditions in either the aqueous paste or dry powder form, and which can be reconverted back to the ordinary water soluble leuco derivative without the use of the strong reducing agents that are required to reduce the ketonic compounds to the leuco form.

It is a further object of this invention to prepare stable leuco compounds of the dibenzanthrone series which can be employed in place of the unstable common leuco derivatives in the preparation of the leuco sulfuric acid esters, or ethers, or in other reactions where the compound is advantageously used in reduced state.

It is a still further object to provide stable reduction products of the alkyl ethers of Bz-2,Bz-2'-dihydroxydibenzanthrone which are in a physical form particularly adaptable to the preparation of dyestuff pastes of extremely high concentration.

We have found that new and valuable stable reduction derivatives of the alkylation products of Bz-2,Bz-2'-dihydroxydibenzanthrone may be prepared by reducing the alkalinity of an alkaline hydrosulfite vat of the same to a pH value of 12 or below and heating at temperatures of from 60 to 90° C. until precipitation of the stable leuco derivatives in the form of well-defined crystals is completed. The alkalinity of the vat may be advantageously reduced by the very slow addition of a weak acid, acid salt, carbon dioxide or sulfur dioxide gas, while the vat is maintained at from 60 to 90° C. In each case care must be taken that the alkalinity of the vat is not reduced so rapidly or to a point where the common leuco compound is precipitated. In general the alkalinity of the vat should be maintained between a pH of 9 to 12, the lower limit at which the stable leuco will be precipitated free from any of the common leuco compounds depends in some extent upon the temperature and the characteristics of the individual compound being converted. By the use of sulfur dioxide or sodium bisulfite the excess caustic in the vat is converted to the alkali metal sulfite whereby the alkalinity is reduced to the required pH value.

The stable reduction product may be isolated by filtering and washing the filter cake free of inorganic salts. It may then be milled into a fluid paste of 50% or less solids content, or the cake may be dried in vacuum or under ordinary air drying conditions and standardized as dispersible powders with the usual diluents and protective colloids, such as dextrine, cerelose, sugars etc. The resulting stable leuco derivatives exhibit properties entirely different from those of the known free leuco compounds of the parent ketonic vat dyestuff, since they are insoluble in cold or warm caustic alkali solutions and are relatively stable to oxidation in the presence of air, and may be stored for long periods of time even when exposed to air. The stable leuco derivatives of this class of vat dyestuffs are in general precipitated in the form of olive colored well defined crystals as distinguished from the corresponding ordinary free leucos of this class which are red or brownish red, or the alkali metal salts which are blue in color. When in pure form they are free from sulfur and are not alkali metal containing compounds. These new stable leuco derivatives while being stable under ordinary conditions can be reconverted to the alkali metal salts of the common leuco, when heated at the boil in strong caustic alkali or when heated at somewhat more moderate temperatures in the presence of certain organic nitrogen bases such as the ethanolamines, pyridine compounds, or with a small amount of an alkali metal hydrosulfite or other reducing agents such as glucose, "Rongalite" and metal salts such as the ferrous and stannous salts. These compounds are all practically insoluble in inert organic solvents such as alcohol, benzene, and nitrobenzene, and are soluble in pyridine with the characteristic bright red color of the leuco compounds of the ordinary alkoxy dibenzanthrone leuco vat dyestuff into which they are converted by such solvent. Strong oxidizing agents such as bleach or chromic acid convert these leuco compounds to the parent ketonic vat dyestuffs or decomposition products thereof.

It has been found that the strong nitrogen bases such as ethanolamines, pyridine, piperidine, betaines of pyridine, quaternary pyridinium and ammonium compounds, ethylene diamine, etc., can be advantageously employed with alkalies for converting the stable leuco derivatives to the alkali metal salts of the ordinary leuco compounds. Those strong nitrogen bases, such as pyridine and triethanolamine which are capable of forming salts of leuco compounds may be used to convert the stable leuco compound to the amine salt of the common leuco.

Example 1

100 parts of dry, purified dimethoxydibenzanthrone (substantially free from vattable impurities) are suspended in 5000 parts of warm water at 55–60° C., containing 100 parts of sodium hydroxide in solution. 100 parts of sodium hydrosulfite (technical) are then added at 55° C. and the mass is stirred at 55–60° C. until a vat is obtained free from insoluble color. An additional 25 parts of sodium hydrosulfite and 100 parts of sodium bisulfite ($NaHSO_3$) are then added and under agitation carbon dioxide gas is bubbled slowly into the clear solutions at 60 to 65° C.

After about 30 minutes of heating, the first precipitation consisting of olive colored crystals is observed, which increases in amount until finally (after 3 to 4 hours of treatment with carbon dioxide gas under stirring at 60 to 65° C.), the stable leuco derivative is completely precipitated.

The precipitate is then filtered off and the cake is washed alkali-free with cold water. It may then be milled up into a fluid color paste of 50% solids content or dried in air at steam bath temperatures, or in vacuum to give an olive colored powder which is stable when exposed to air under normal conditions.

The dry product as well as the paste are quite insoluble when heated quickly to the boil in diluted aqueous sodium hydroxide suspensions containing from 0.5% to 10% sodium hydroxide. However, when a trace of pyridine or of triethanolamine is added to the boiling suspension or when the heating period is prolonged the usual deep blue vat containing the sodium salt of leuco dimethoxydibenzanthrone is obtained, from which cotton is dyed in the usual shades of the parent material.

The olive colored crystals are soluble in pyridine with a bright red color which on exposure to air in the pyridine solution is converted to the greenish-blue color of the dimethoxydibenzanthrone in pyridine solutions.

The olive colored leuco derivative is very slightly soluble or practically insoluble in alcohol and all common inert solvents, such as benzene, nitrobenzene, etc., imparting to the solvent, a slight red coloration which, however, is changed to green when exposed to air at elevated temperatures.

In concentrated sulfuric acid the product is oxidized immediately to the ketonic vat dye, or its hydrolyzation products, imparting a deep red coloration to the sulfuric acid.

Example 2

100 parts of purified dimethoxydibenzanthrone are vatted and the vat is treated with the same amounts of sodium bisulfite and carbon dioxide gas under exactly the same conditions as described in Example 1 above.

After the precipitation of the olive colored stable leuco derivative is completed, the alkalinity of the suspensions is reduced by the addition of 50 parts of sodium bisulfite and the mass is air-blown at 65 to 70° C. for several hours, until a test portion, when made strongly alkaline with an excess of sodium hydroxide, does not give a vat at ordinary temperature, indicating that all hydrosulfite had been decomposed. The olive colored precipitate is then filtered off. It is identical in every respect to the product of Example 1.

Example 3

100 parts of dimethoxydibenzanthrone are vatted with 100 parts of sodium hydroxide and 125 parts of sodium hydrosulfite in 4000 parts of water at 60–65° C. for one-half hour. 75 parts of sodium bisulfite are then added and the solution is treated for three hours at 65 to 70° C. with a slow stream of carbon dioxide gas.

The precipitate (olive colored crystals) is filtered off. It is identical with the product of Example 1.

Example 4

100 parts of purified dimethoxydibenzanthrone are vatted in 5000 parts of water by the addition of 140 parts of potassium hydroxide and 100 parts of sodium hydrosulfite under agitation for 30 minutes at 50 to 55° C. An additional 25 parts of sodium hydrosulfite are added and a slow stream of sulfur-dioxide gas is passed into the vat for about 5 hours while heating under agitation at 60–70° C., until the mass becomes slightly acid when tested with blue litmus paper.

The olive colored precipitate is filtered off. It is identical with the product of Example 1. Molecular quantities of sodium hydroxide may be substituted for the potassium hydroxide in this example.

Example 5

208 parts of a commercial "Ponsol" Jade Green Supra paste containing 100 parts of dry color are vatted with 120 parts of sodium hydroxide, 120 parts of sodium hydrosulfite and 3000 parts of water at 60 to 65° C. 30 parts more sodium hydrosulfite and 150 parts of sodium bisulfite are then added at 65 to 68° C. and a slow stream of carbon dioxide gas is introduced at this temperature until precipitation of the olive colored, stable leuco derivative is complete. The isolated product is identical with the product of Example 1.

Example 6

An amount of a filter press cake of technically pure dimethoxydibenzanthrone equivalent to 100 parts of dry, pure color are suspended in 4500 parts of water at 60° C. 100 parts of sodium hydroxide and 120 parts of technical sodium hydrosulfite are then added and the vat is stirred at 68–70° C. for one hour. 150 parts of sodium bisulfite are then added slowly under agitation and the vat is heated to 75° C. and stirred at this temperature for four hours, or until precipitation of the olive colored stable leuco derivative is completed.

The suspension is then cooled, the precipitate is filtered off and washed alkali-free with cold water.

The olive colored filter cake is composed of somewhat larger crystals than the filter cake of Example 1 but the product is otherwise identical therewith.

Example 7

An amount of color paste, containing the equivalent of 50 parts of the dry, purified reaction product from Bz-2:Bz-2'-dihydroxydibenzanthrone and ethylene dibromide, (Example 4 U. S. Patent 1,950,366) are vatted with 50 parts of sodium hydroxide and 50 parts of sodium hydrosulfite in 2000 parts of water, until a clear vat is obtained, which is then filtered.

The filtrate is further diluted with 2000 parts of water containing 40 parts of sodium hydroxide and 55 parts of sodium hydrosulfite and while heating at 65° C., 125 parts of sodium bisulfite are stirred into the vat. A very slow stream of carbon dioxide gas is then passed in the vat under agitation at 65 to 70° C. for a total of five hours, or until all the color is precipitated out of solution in the form of well defined olive colored crystals. The precipitate is filtered off and the cake washed alkali-free and milled to a smooth color paste of approximately 30% color solids content.

The product is stable towards air oxidation and insoluble when suspended in aqueous solutions of caustic alkalis at temperatures up to about 60° C. At the boil, or when a trace of pyridine or of triethanolamine is added to the warm alkaline suspension, the common deep blue colored vat of the parent material is obtained.

The solubility properties of the dry stable leuco derivative in the various organic solvents and in concentrated sulfuric acid is quite similar to that described in Example 1 for the stable leuco of dimethoxydibenzanthrone.

Example 8

100 parts of the purified ethylene ether of dihydroxydibenzanthrone (as used in Example 7) are suspended in 4500 parts of warm water, containing 100 parts of sodium hydroxide.

120 parts of technical sodium hydrosulfite are then added at 70° C. and the vat is stirred for one hour at 70 to 72° C. 150 parts of sodium bisulfite are then added and the mass is stirred at 70 to 72° C. for four hours, or until precipitation of the stable leuco derivative in the form of small olive colored crystals is completed.

The precipitate is filtered off and the cake washed free of alkalis with cold water and then milled to a smooth fluid paste containing approximately 45% color solids. The product is identical with the product of Example 7.

Example 9

25 parts of the purified bluish-green vat dyestuff, obtained by condensing Bz-2,Bz-2'-dihydroxydibenzanthrone with 1, 3-dibromopropane by the process as outlined in Example 4. U. S. Patent 1,950,366, are suspended in 1500 parts of warm water, containing 60 parts of sodium hydroxide in solution. After adjusting the temperature to 68–70° C., 50 parts of sodium hydrosulfite are stirred into the suspension, which is heated for one hour at 70° C. under agitation. 75 parts of sodium bisulfite are now added and the clear, deep blue colored vat is stirred for four hours at 75° C., until the precipitation of the stable leuco derivative in the form of olive-green colored crystals is completed.

The precipitate is then filtered off, the cake washed free of salts and milled into a smooth color paste of 30% color solids content. When dried at steam bath temperatures the dry olive-green colored leuco derivative remains unaltered.

When suspended in aqueous sodium hydroxide solutions, the stable leuco derivative remains insoluble at moderately elevated temperatures, although at the boil, or when a trace of pyridine or triethanolamine is added, the usual blue vat (exhibiting a strong red fluorescence) of the parent dyestuff is obtained.

The solubility and stability properties of the dry leuco derivative in organic solvents and in concentrated sulfuric acid are similar to those of the product of Example 1.

Example 10

Ten parts of the purified blue dyestuff obtained by condensing 1,3-dichloro-2-butene with Bz-2,-

Bz-2'-dihydroxydibenzanthrone by the procedure described in Example 4 U. S. Patent 1,950,366, are suspended in 1000 parts of warm water, containing 24 parts of sodium hydroxide in solution. 24 parts of technical sodium hydrosulfite are then added at 65° C. and the vat is stirred at 65 to 70° C. for one-half hour. 6 parts more sodium hydrosulfite and 30 parts of sodium bisulfite are stirred into the clear vat, which is then treated with a slow stream of carbon dioxide for four hours at 68 to 70° C. or until precipitation of the stable leuco derivative of the color in the form of olive colored, well defined crystals with bronzy luster is completed. The product is filtered off, washed alkali-free and milled to a color paste of 25% color solids. The treatment of the vat with carbon dioxide in this example may be omitted if the sulfite solution is heated at 70–75° C. for a prolonged time.

The stable leuco derivative is quite insoluble in aqueous sodium hydroxide solutions when heated quickly to the boil, but on prolonged heating, a blue vat is obtained from which cotton is dyed in blue shades, identical with those obtained from the parent dyestuff, when it is vatted in alkaline hydrosulfite solutions.

The solubility properties of the stable leuco derivative of this vat blue in organic solvents and in concentrated sulfuric acid, are similar to those of the product of Example 1.

In the preparation of the stable leuco compounds as disclosed in the above examples, it is essential that relatively pure alkoxy compounds be employed, for it has been found that the presence of substantial amounts of many of the impurities which normally occur in the preparation of these alkoxy derivatives retards or in some cases actually prevents the formation of the leuco derivatives of these colors in desirable stable form.

The degree of dilution and the amounts of caustic alkali and sodium hydrosulfite employed in the vatting of the parent dyestuff may be varied within wide limits. While the total amount of reducing agent (hydrosulfite or its equivalent) which should be used depends somewhat upon the degree of air oxidation to which the vat is exposed and upon the ease with which the particular compound is vatted and the temperature of the vat, we have found that .75 part of sodium hydroxide and .75 part of sodium hydrosulfite (technical) per part of color is sufficient. These amounts may be reduced considerably when working with large volumes in closed vessels or when working under conditions which minimize the surface exposure to air oxidation. Much larger quantities of sodium hydrosulfite or sodium or potassium hydroxide may of course be employed. 1.5 parts of sodium hydroxide with 1.5 parts of sodium hydrosulfite per part of color have been employed, although when using these large amounts correspondingly large amounts of sodium bisulfite must be used.

For the purpose of reducing the alkalinity of the vat to a pH of from 9.0 to 12.0 any suitable weak acid, such as for instance the lower aliphatic acids, or alkali metal salts such as sodium hydrosulfite or sodium acid sulfate may be used. It is important to maintain reducing conditions in the vat for some time after the alkalinity has been adjusted to a pH of from 9.0 to 12.0, for otherwise oxidation of the unstable leuco back to the ketonic parent dyestuff may occur, causing precipitation of the vat color together with some of the stable leuco derivative.

These new stable leuco derivatives may be employed in the dyeing or printing of fibers and in the preparation of lakes where the vat dye in reduced form must be employed. They are also valuable as intermediates for the preparation of color compounds for various uses.

They are particularly suitable for use in the preparation of the leuco sulfuric acid esters of the corresponding dyestuffs and in other reactions where the color in reduced form is desired.

These products may be dyed and printed on fibers by the ordinary processes used for dyeing the parent color. They may, however, also be used in dyeing and printing without the use of alkaline hydrosulfite or other reducing agents and in the presence of the usual printing assistants, dispersing agents, penetrating agents, anti-coagulants and other hydrotropic agents which have heretofore been employed in connection with the printing or dyeing of the ordinary vat dyestuffs. These colors may be used with the so-called non-volatile reducing agents, such as glucose or related products or metallic salts. They are particularly suitable for use in combination with the stabilized azoic or other colors such as the leuco sulfuric acid esters of vat dyestuffs, since these colors may be applied without the use of reducing agents.

The following examples are given to illustrate methods by which these stable leuco derivatives may be applied to fibers without the use of reducing agents. Any of the usual printing gum thickener formulas in which the reducing agent has been omitted may be employed.

*Example I*

10 parts of the color paste of 6% to 20% color solids are incorporated into 90 parts of either of the following gum thickeners subject of course to further dilution with extending thickeners if desired.

1. Starch, tragacanth, British gum thickener

| | Parts |
|---|---|
| Wheat starch | 3 |
| British gum | 30 |
| Water | 30 | are cooked to a smooth paste at 180–200° F. for 30 minutes. To this paste are added 5 to 19 parts of sodium or potassium carbonate which is allowed to dissolve in the gum,

| | Parts |
|---|---|
| Glycerine | 15 |
| Triethanolamine | 5 to 20 |

(or other organic nitrogen base as described above). Stir to a smooth paste and cool.

2. Starch, tragacanth gum thickener

| | Parts |
|---|---|
| Wheat starch | 80 |
| Gum tragacanth | 360 |
| Water | 510 |

This is cooked until the starch breaks. It is cooled to 100° F. and 50 parts of glycerine are added.

| | Parts |
|---|---|
| This paste | 66 to 85 |
| Triethanolamine (technical) | 5 to 25 |
| Potassium carbonate | 5 to 19 | are cooked to 160° F. until the carbonate is dissolved.

The cloth is printed, dried, aged in steam in the usual manner, oxidized, soured, soaped and dried. The second paste is particularly applicable where these colors are used in combination with stabilized azoic colors, either in the same pattern or as actual mixtures of the colors. In such case the neutral aging should precede the acid aging usually required to develope the stabilized azoic color.

In the above formula the triethanolamine or other nitrogen bases may be omitted from the printing thickeners if they have been previously incorporated in the dye paste.

Example II

These colors may be applied by the usual padding methods using hydrosulfite, or without a reducing agent as follows.

The desired amount of color paste is added to an aqueous solution containing the following ingredients.

| | Per cent |
|---|---|
| Water | 75 to 94 |
| Potassium or sodium carbonate | 10 to 1 |
| Triethanolamine | 15 to 5 |

The fiber is padded in this suspension at a temperature low enough to prevent reconversion of the stable leuco compound to the ordinary vat, the maximum temperature depending upon the concentration of the alkali and/or nitrogen base. The padded goods is dried, and then steamed to convert the product to the common leuco derivative. It is then oxidized, soured, soaped and dried in the usual manner.

The color may also be padded or printed in the presence of alkali, as illustrated above without the addition of the nitrogen base or reducing agent, if a volatile nitrogen base such as pyridine is employed in vapor form in the steaming operation.

We claim:

1. The water insoluble reduction derivatives of the alkyl ethers of Bz-2,Bz-2'-dihydroxydibenzanthrone which in the dry pure form are in general olive colored crystalline products stable in air under ordinary atmospheric conditions, insoluble in dilute caustic alkalies at ordinary temperatures, being convertible to the common leuco form of the parent material when heated in strong caustic alkalies, or in more dilute caustic alkali solutions in the presence of strong organic nitrogen bases, or with alkaline reducing agents; said reduction derivatives being practically insoluble in inert non-basic organic solvents of the class consisting of benzene, homologues of benzene, the chlorinated benzenes, naphthalene, and aliphatic hydrocarbons, at room temperature, soluble in pyridine with the characteristic bright red color of the common leuco compounds from which they have been derived, which color changes when exposed to air to the color characteristic of pyridine solutions of the parent ketonic dyestuff, and soluble in cold concentrated sulfuric acid with a violet red color.

2. The water insoluble stable reduction product of Bz-2,Bz-2'-dimethoxydibenzanthrone which in dry pure form is a yellowish olive colored crystalline product stable to air oxidation under ordinary atmospheric conditions, and insoluble in dilute caustic alkalies at ordinary temperatures; said compound being reconvertible to the alkali-metal salt of the common leuco of the dimethoxydibenzanthrone when heated in strong caustic alkali solutions, or in more dilute caustic alkali in the presence of strong organic nitrogen bases; being practically insoluble in inert non-basic organic solvents of the class consisting of benzene, homologues of benzene, the chlorinated benzenes, naphthalene, and aliphatic hydrocarbons, at room temperature, soluble in pyridine with a bright red color which on exposure to air is converted to the greenish blue color of the dimethoxydibenzanthrone in pyridine, and soluble in cold concentrated sulfuric acid with a violet-red color.

3. The process for preparing stable reduction derivatives of the alkyl ethers of Bz-2,Bz-2'-dihydroxydibenzanthrone which comprises preparing an alkaline hydrosulfite vat of the color, reducing the pH of the vat to from 9 to 12 and to where the olive colored reduction product is precipitated to the exclusion of the common free leuco derivative, while maintaining the temperature of the vat at from 60 to 90° C., until substantially complete precipitation of the reduction derivative which is stable to air oxidation is effected.

4. The process for preparing stable reduction derivatives of the alkyl ethers of Bz-2,Bz-2'-dihydroxydibenzanthrone which comprises preparing a caustic alkali hydrosulfite vat of the color, converting the excess alkali to an alkali-metal sulfite to such an extent that the pH value of the solution is reduced to from 9 to 12 and to where the common free leuco derivative is not precipitated, while maintaining the temperature of the vat at from 60 to 90° until substantially complete precipitation of the olive colored reduction derivative which is stable to air oxidation is effected.

5. The process for preparing stable reduction derivatives of Bz-2,Bz-2'-dimethoxydibenzanthrone which comprises preparing a caustic alkali hydrosulfite vat of the color, converting the excess alkali to an alkali-metal sulfite to such an extent that the pH value of the solution is reduced to from 9 to 12 and to where the common free leuco derivative is not precipitated, while maintaining the temperature of the vat at from 60 to 90° C. until substantially complete precipitation of the olive colored reduction derivative which is stable to air oxidation is effected.

OTTO STALLMANN.
WILLIAM M. WENTZ.